3,385,684
MULTICRYSTALLINE DIAMOND ABRASIVE
COMPOSITION AND ARTICLE
Roger Conant Voter, Wilmington, Del., assignor to E. I. du Pont de Nemours and Company, Wilmington, Del., a corporation of Delaware
No Drawing. Continuation-in-part of application Ser. No. 371,802, June 1, 1964. This application Jan. 3, 1966, Ser. No. 528,328
11 Claims. (Cl. 51—298)

ABSTRACT OF THE DISCLOSURE

Resin bonded abrasive articles such as grinding wheels utilizing diamonds as the abrasive wherein from 15 to 45 percent of the diamonds are multicrystalline in nature rather than being single crystal diamonds.

---

This application is a continuation-in-part of my co-pending application Ser. No. 371,802, filed June 1, 1964 and now abandoned.

This invention relates to improved abrasive compositions and to articles made therefrom and, more particularly, to an improved resin bonded abrasive composition containing multicrystalline synthetic diamonds and to articles made of such compositions.

Abrasive articles employing synthetic diamonds are used extensively in the metal working industry for grinding hard materials such as tungsten carbide and the like. Such abrasive articles generally are formed from an abrasive such as diamond grit embedded in a bonding agent. Fillers may also be employed. The grinding can be done under wet or dry conditions. The present invention is directed to the use of multicrystalline synthetic diamonds in a resin bonded article.

Heretofore it has been known to employ both natural and synthetic diamonds in the manufacture of abrasive articles. The diamonds heretofore employed have been of the single crystal nature, hereinafter called single crystal diamonds. These diamonds have been bonded in a matrix consisting of a resin such as phenol formaldehyde.

The heretofore known abrasive articles employing single crystal diamonds have not been able to realize their full potential because the diamonds are lost or dislodged from the cutting face of the wheel before the full grinding ability of the diamond particle has been realized. In such applications, the single, more important factor in regulating and controlling the length of useful life of the abrasive article has been the strength of the bond between the diamond crystal and the resin matrix. Under grinding conditions, when sufficient stress is placed upon the diamond particle to sever the bond between such particle and the resin matrix, the diamond is dislodged, thus reducing the grinding efficiency of the abrasive article.

Heretofore it had been believed that only single crystal diamonds, either natural or synthetic, were suitable for use in abrasive articles. It was believed that multicrystalline diamonds were not suitable since they exhibited a tendency to crush under very low pressures. Multicrystalline diamonds are those synthetic diamonds in which individual particles show distinctive individual crystal boundaries. The profile of these particles is generally quite irregular and shows sharp points and reentrant angles. Multicrystalline diamonds may be further classified as simple or complex. For a given grit size the length and width of the simple multicrystalline diamonds is approximately equal while for the complex multicrystalline diamonds the length is approximately twice the width.

It has now been discovered in accordance with the present invention that an abrasive composition having improved grinding efficiency can be prepared by mixing a critical percentage of simple and complex multicrystalline synthetic diamonds with single crystal diamonds. The resultant mixture is then incorporated into a resin bond.

It has further been discovered that the percentage of multicrystalline diamonds employed is critical to obtain optimum grinding efficiency. Utilizing diamond grit having a Tyler screen size of 200 to 100, it has been discovered that from 15 to 45 percent by weight of the diamonds employed must be of a multicrystalline nature to achieve high grinding efficiency. A lower percentage of multicrystalline diamonds yields a lower grinding efficiency since there are not sufficient multicrystalline diamonds present to enhance the grinding efficiency while more than 45 percent multicrystalline diamonds will produce an abrasive article which will have a lower grinding efficiency because the multicrystalline diamonds will tend to crush under pressure.

The percentage of multicrystalline diamonds necessary to obtain the optimum grinding efficiency will vary with the average particle size of the diamonds employed. It has been discovered that over the normal commercial range of 200 to 100 Tyler screen grit size, as the mean particle diameter of the diamonds employed decreases, the weight percent of multicrystalline diamonds required to obtain the optimum grinding efficiency will decrease. These values may be normalized to give a normalized total multicrystalline index in order to compensate for variation in grit size by dividing the actual percentage by the mean particle diameter. Generally a normalized multicrystalline index of from 5 to 10 is preferred.

The multicrystalline diamond particles when employed in a resin bonded abrasive article and placed under grinding stress exhibit a tendency to part at the interface before releasing at the bond. Only a small portion of the diamond particle is dislodged, leaving the remainder of the multicrystalline diamond particle embedded in the resin matrix. Thus, instead of the entire diamond becoming dislodged from the resin matrix the residual particles remain and these residual particles serve to provide additional cutting edges, resulting in an improved grinding efficiency for such an abrasive article.

In the research made in the discovery of the present invention, it has been found that by the use of special thermoplastic materials in the resin matrix a stronger bond between the resin matrix and the diamond particle in the abrasive article of the present invention will result. During grinding with the diamond abrasive article there is contact between the extreme outer ends of the diamond particles and the surface being ground. At this point of contact substantial quantities of heat are developed. A portion of this heat is dissipated by radiation into the air or into a coolant, but a large proportion of such heat is conducted through the diamond particle to its base portion and is there transferred to the resin matrix. As the heat increases the diamond particle and the resin matrix expand at different rates and the bond tends to weaken. Ultimately, the pressure on the diamond particle, resulting from its being forced against the article being ground, exceeds the adhesive holding power of the resin matrix and the particle becomes dislodged. It has been discovered that the use of essentially linear resins having a second order transition temperature greater than 250° C. as determined by flexural moduli versus temperature plots and a room temperature modulus above 300,000 p.s.i. results in an enhanced bond. Such resins include aromatic polyimides, aromatic polyamides, aromatic polyketones, polybenzimidazoles, aromatic polyimines, polybenzotriazoles, and aromatic polythiazoles. The use of these resins will result in substantially improved over-all grinding efficiency. While the use of such resins is preferred, the use of a critical percentage of multicrystalline diamonds as an abrasive will also improve the grinding efficiency of a resin bonded abrasive article utilizing a resin such as phenol formaldehyde. The volume percent of resin required in the diamond grit-resin mixture may vary widely depending upon the desired characteristics of the resultant composition. Generally, abrasive articles are desired in the form of 100 concentration articles. It has been found that a 100 concentration abrasive article utilizing the composition of the present invention will employ about 75 volume percent resin. This figure will vary with the use of fillers. The lower limit will be governed by the necessity to bond the composition together, and the upper limit will be governed by the grinding ratio desired. A high percentage of resin will obviously result in a lower grinding ratio.

The percent of multicrystalline diamonds in a given batch of synthetic diamonds may be determined by study with a microscope. These findings may alternatively be determined by a study utilizing X-ray diffraction. While the microscope study may be carried out upon the synthetic diamonds in an air medium in the microscope stage, it has been found that superior results may be obtained by covering the diamond samples with a molten mixture of selenium and sulfur. The molten selenium-sulfur provides a medium of refractive index near that of diamond so that the radiation from the sub-stage light source passes through the particles rather than being mostly reflected by the particles, particularly the irregularly shaped ones, as it is when such particles are studied in an air medium.

It was found, through optical study and measurement, that for a given grit size, e.g., 120–140, that the length of the complex multicrystalline particles was approximately twice the width of such a particle. In the case of simple multicrystalline diamonds the length and width were approximately equal. It is thus apparent that the complex multicrystalline particles, having such a long length as compared to the simple multicrystalline particles, would show a marked tendency to form a stronger bond with a resin matrix. Thus, the quantitative factor referred to as a grinding index was developed to correlate the percentage of complex multicrystalline and simple multicrystalline diamonds in a given abrasive composition. This grinding index was determined to be two times the number of complex multicrystalline particles, plus one times the number of simple multicrystalline particles in a given composition. The complex multicrystalline particles were weighted by a factor of 2 because the length of such particles was approximately twice the length of simple multicrystalline particles. This grinding index can be normalized to compensate for different average grit sizes by dividing the measured figure by the mean particle diameter. Generally a normalized grinding index of from 7 to 16 is preferred.

Various fillers may be incorporated into the abrasive composition of the present invention to vary the cooling, lubricating and abrasive properties thereof as desired. Such fillers include silicon carbide, molybdenum disulfide, cryolite, metal powders such as particulate iron and copper, particulate polytetrafluoroethylene resin, boron nitrite, iron sulfide, graphite, sodium chloride, asbestos, clay, mica, vermiculite, metal carbides, copper fibers, kaolin, metal oxides such as aluminum oxide, mixtures thereof and the like.

In the course of the present invention it has been discovered that in the case of dry grinding the use of fillers is especially important since their use in proper amounts increases the efficiency of the grinding operation.

It has also been discovered that a range of 10 to 40 volume percent of filler in the nondiamond phase is preferred. Below 10 volume percent, only minor improvement in dry grinding efficiency can be found. Above about 40 volume percent, problems arise in the molding of the composition because of the small volume percent of the resin in the composition.

The particle size of the added filler will also control the volume percent of filler employed. When fine fillers having a particle size of about 10 microns are used, only a low volume percent of filler can be employed. If larger filler particles are used, then a larger volume percent of filler can be employed. It has been discovered, however, that if the filler particles are larger than the diamond particles, beneficial improvements in dry grinding are not observed. The preferred particle size is from about 10 to about 40 microns.

The invention of the present application is further illustrated by the following examples which are intended to be merely illustrative and not limiting.

Example I

A number of abrasive compositions were prepared by admixing different batches of diamond grit with 55 weight percent of an essentially linear aromatic polyimide resin binder having a second order transition temperature greater than 250° C. as determined by flexural moduli versus temperature plots and a room temperature modulus above 300,000 p.s.i. These compositions differed only in the nature of the diamond batches employed as set forth in the table below.

A number of 5¾ inch diameter aluminum disks, having a 3/16 inch thickness, were centered within 6 inch diameter circular molds. A diamond grit-resin mixture was compacted into the resultant mold cavities to a depth of 3/16 inch. The molds and their contents were heated to a temperature of about 270° C. and subjected to a pressure of about 45,000 p.s.i. The resultant preforms were then removed from the molds and heat-treated for approximately 16 hours in a vacuum oven at a temperature of about 300° C. to complete the imidization of the resin. The preforms were then free sintered in a substantially inert atmosphere at a temperature of about 450° C. for a period of about 30 minutes. After sintering, the articles were allowed to cool to room temperature gradually.

The resultant articles were grinding wheels having an outside diameter of 6 inches and a thickness of 3/16 inch and at the periphery of the aluminum disks there was a ⅛ inch layer of the sintered diamond grit-resin abrasive composition. The resultant grinding wheels were dressed to a diameter tolerance of +25 mils, −0 mil; a thickness tolerance of +20 mils, −0 mil; and a rim depth tolerance of +10%, −0%. The lateral runout was maintained below 5 mils. The radial rim runout was maintained below 2 mils.

Wet grinding ratio

The grinding wheels were tested by operation a Gallmeyer and Livingston #28 grinder. The wheel surface speed was 6280 feet per minute; the table speed was 50 feet per minute; cross feed was 0.050 inch per table reversal, and downfeed was 0.001 inch per pass across a "Carboloy" 370 grade work block of tungsten carbide having a Rockwell A hardness of 90.2 to 92.2 under a 60 kg. load. The surface of the work block measured 2″ x 9″. A solution 2.7% International 218X grinding coolant additive in water was fed at a rate of 100 cc. per second at the point of contact of the wheel and the work block.

The grinder was operated to remove 75 mils from the depth of the tungsten carbide work block for six successive 75 mil increments. The wheel was allowed to cool for a period of about 30 minutes after each 75 mil increment and then micrometer readings of the amount of wheel removed for each 75 mil increment were taken. A wet grinding ratio, equal to the volume of work block removed to the volume of abrasive rim removed, was determined for each of the six increments. These were averaged to yield an overall grinding ratio which would eliminate the sinusoidal wear characteristics of grinding wheels resulting from their self dressing property. The result of the tests of the various diamond grit batches are summarized in Table I below. All test wheels had a Rockwell H hardness of 68–81.

TABLE I

| Sample No. | Grit Size | Percent Diamonds | | | | | Normalized Total Multi-crystalline Index | Grinding Index | Normalized Grinding Index | Wet Grinding Ratio |
|---|---|---|---|---|---|---|---|---|---|---|
| | | Natural | Single Crystal | Simple Multi-crystalline | Complex Multi-crystalline | Total Multi-crystalline | | | | |
| 1 | 120-140 | 100 | 0 | 0 | 0 | 0 | 0 | 0 | 0 | 43 |
| 2 | 120-140 | 0 | 53 | 20 | 27 | 47 | 10.4 | 74 | 16.4 | 88 |
| 3 | 120-140 | 0 | 65 | 13 | 22 | 35 | 7.8 | 57 | 12.7 | 131 |
| 4 | 120-140 | 0 | 64 | 7 | 29 | 36 | 8.0 | 65 | 14.4 | 97 |
| 5 | 120-140 | 0 | 74 | 13 | 13 | 26 | 5.8 | 39 | 8.7 | 117 |
| 6 | 120-140 | 0 | 69 | 13 | 18 | 31 | 6.9 | 49 | 10.9 | 117 |
| 7 | 120-140 | 0 | 72 | 14 | 14 | 28 | 6.2 | 42 | 9.3 | 92 |
| 8 | 210-140 | 0 | 55 | 20 | 25 | 45 | 10.0 | 70 | 15.6 | 96 |
| 9 | 120-140 | 0 | 74 | 11 | 14 | 26 | 5.8 | 39 | 8.7 | 95 |
| 10 | 100-120 | 0 | 57 | 16 | 27 | 43 | 8.0 | 70 | 13.0 | 102 |
| 11 | 170-200 | 0 | 71 | 13 | 16 | 29 | 9.1 | 45 | 14.1 | 141 |
| 12 | 170-200 | 0 | 83 | 9 | 8 | 17 | 5.3 | 25 | 7.8 | 130 |
| 13 | 170-200 | 0 | 68 | 13 | 19 | 32 | 10.0 | 51 | 15.9 | 124 |

It may be seen from the above data that the absence of multicrystalline particles (Sample 1) yields a low wet grinding ratio while the presence of 15 to 45 weight percent of multicrystalline diamonds yields wet grinding ratios in excess of 90.

Example II

An abrasive composition was prepared by admixing 10 grams of a 120–140 grit synthetic diamond mixture containing by weight 13 percent simple multicrystalline diamonds and 18 percent complex multicrystalline diamonds with 11.5 grams of 600 mesh silicon carbide and 8.4 grams of phenolic resin. This mixture was placed in the mold of Example I and preheated under vacuum for about 2 hours at a temperature of about 150° C. Pressure of about 3000 p.s.i. was applied to the mold for a period of about 30 minutes while maintaining the mold temperature at about 150° C. The resultant preformed wheel was sintered in an essentially inert atmosphere for about 17 hours at a temperature of about 190° C.

The resultant grinding wheel was subjected to the test of Example I and the wet grinding ratio was found to be 97.

Example III

A number of abrasive compositions containing 100 concentration of 120–140 grit synthetic diamonds were prepared by admixing the diamonds with a resin binder, a polyimide resin made from pyromellitic dianhydride and 4,4'-oxydianiline, with several volume percent of the non-diamond phase being replaced by suitable fillers. These compositions were used to fill the cavity created by a cylindrical aluminum core, undercut on one end at an angle of approximately 70° to a length of about one-half inch, which was inserted into a 5" diameter circular mold. The diamond-resin-filler mixtures were compacted into the cavity and the molds and their contents were heated to a temperature of about 270° C. and subjected to a pressure of about 50,000 p.s.i. The resultant preforms were then removed from the molds and heat-treated for approximately 16 hours in a vacuum oven with a nitrogen bleed at a temperature of about 300° C. to complete the imidization of the resin. The preforms were then free sintered in a subtsantially inert atmosphere at a temperature of about 450° C. for a period of about 30 minutes. After sintering, the articles were allowed to cool to room temperature gradually.

The resultant articles were then machined into grinding wheels of the flaring cup configuration having an outside diameter of 5 inches, a thickness of 1¾ inches, a back thickness of ⁷⁄₁₆ inch, an inside flat diameter of 3¼ inches, an approximate back angle of 70 degrees, and at the periphery of the cup there was a ⅛ inch depth of the sintered diamond-resin-filler composition extending to a length of ⁷⁄₁₆ inch. These wheels were dressed to a diameter tolerance of ±25 mils, a diamond depth tolerance of +12 mils, —0 mils, a radial runout of 5 mils maximum, and a lateral runout of 2 mils maximum.

Dry grinding ratio

The grinding wheels were tested by operation on a Gallmeyer and Livingston #28 grinder with the axis of rotation horizontal. The wheel surface speed was 2600 feet per minute; the table speed was 6 feet per minute; the work infeed was 1 mil on alternate table reversals; and the work consisted of an array of three "Carboloy" 370 grade work blocks of tungsten carbide having a Rockwell A hardness of 90.2 to 92.2 under a 60 kg. load. The blocks used for each set of runs, control and test, were of the same batch of tungsten carbide. Slight variations which existed between different sets of runs were due to variations in the hardness of the tungsten carbide work blocks employed. The surface of each work block measured ½ inch by ¾ inch and the blocks were spaced in a line along the greater dimension with a distance of 2¾ inches between blocks. The blocks were positioned in a way such that the lower edge just cleared the inside of the wheel rim and two bites into the work per table reversal were made. No coolant fluid was used.

The grinder was operated to remove at least 150 mils in depth of the tungsten carbide work blocks and preferably 250 mils was removed. A dry grinding ratio, equal to the volume of tungsten carbide removed over the volume of abrasive rim removed, was determined. The results of the tests of various compositions are summarized

TABLE II

| Sample No. | Run No. | Vol. percent filler in Nondiamond Phase | Percent Diamonds | | | | | Normalized Total Multi-crystalline Index | Grinding Index | Normalized Grinding Index | Dry Grinding Ratio |
|---|---|---|---|---|---|---|---|---|---|---|---|
| | | | Grit Size | Single Crystal | Simple Multi-crystalline | Complex Multi-crystalline | Total Multi-crystal line | | | | |
| 14 | 1 | 30% SiC (600 mesh) | 120-140 | 75 | 11 | 14 | 25 | 5.6 | 39 | 8.7 | 38 |
| | 2 | do | 120-140 | 75 | 11 | 14 | 25 | 5.6 | 39 | 8.7 | 118 |
| Control | 1 | 0 | 120-140 | 72 | 14 | 14 | 28 | 6.2 | 42 | 9.3 | 11 |
| | 2 | do | 120-140 | 75 | 11 | 14 | 25 | 5.6 | 39 | 8.7 | 19 |
| 15 | 1 | 40% SiC (600 mesh) | 120-140 | 75 | 11 | 14 | 25 | 5.6 | 39 | 8.7 | 40 |
| | 2 | do | 120-140 | 75 | 11 | 14 | 25 | 5.6 | 39 | 8.7 | 140 |
| Control | 1 | 0 | 120-140 | 72 | 14 | 14 | 28 | 6.2 | 42 | 9.3 | 12 |
| | 2 | do | 120-140 | 75 | 11 | 14 | 25 | 5.6 | 39 | 8.7 | 15 |
| 16 | 1 | 10% Graphite (25 micron) | 120-140 | 75 | 11 | 14 | 25 | 5.6 | 39 | 8.7 | 60 |
| | 2 | do | 120-140 | 75 | 11 | 14 | 25 | 5.6 | 39 | 8.7 | 41 |
| Control | 1 | 0 | 120-140 | 75 | 11 | 14 | 25 | 5.6 | 39 | 8.7 | 19 |
| | 2 | do | 120-140 | 75 | 11 | 14 | 25 | 5.6 | 39 | 8.7 | 17 |
| 17 | 1 | 20% Al₂O₃ (600 mesh) | 120-140 | 75 | 11 | 14 | 25 | 5.6 | 39 | 8.7 | 41 |
| | 2 | do | 120-140 | 75 | 11 | 14 | 25 | 5.6 | 39 | 8.7 | 39 |
| Control | 1 | 0 | 120-140 | 72 | 14 | 14 | 28 | 6.2 | 42 | 9.3 | 20 |
| | 2 | do | 120-140 | 75 | 11 | 14 | 25 | 5.6 | 39 | 8.7 | 19 | in Table II and a comparison is made with the results of tests made using an unfilled control wheel to grind the same array of tungsten carbide work blocks. Two tests per wheel using different work blocks are shown and indicate that generally, with increasing use, the grinding ratio increases. There is no corresponding increase for the unfilled control wheels. Suitable filled wheels were found to have a dry grinding ratio of at least 24.

I claim:

1. An abrasive composition comprising synthetic diamonds having a grit size of 200 to 100 Tyler screen size, from 15 to 45 percent of said diamonds being multicrystalline, and having a normalized grinding index of from 7 to 16, and a resin selected from the group consisting of phenol formaldehyde resins and essentially linear resins having a second order transition temperature of at least 250° C. and a room temperature modulus of at least 300,000 p.s.i.

2. The composition of claim 1 wherein the diamond mixture has a normalized total multicrystalline index of from 5 to 10.

3. The composition of claim 2 wherein the resin is a phenol formaldehyde resin.

4. The composition of claim 2 wherein the resin is an essentially linear resin.

5. The composition of claim 4 wherein the essentially linear resin is an aromatic polyimide.

6. A grinding wheel having a resin bonded diamond grinding surface in which the diamonds have a grit size of 200 to 100 Tyler screen size, from 15 to 45 percent of said diamonds being multicrystalline, and having a normalized grinding index of from 7 to 16 and wherein said resin is selected from the class consisting of phenol formaldehyde resins and essentially linear resins having a second order transition temperature of at least 250° C. and a room temperature modulus of at least 300,000 p.s.i.

7. The grinding wheel of claim 6 wherein the diamond mixture has a normalized total multicrystalline index of from 5 to 10.

8. The grinding wheel of claim 7 wherein the resin is a phenol formaldehyde resin.

9. The grinding wheel of claim 7 wherein the resin is an essential linear resin.

10. The grinding wheel of claim 9 wherein the essentially linear resin is an aromatic polyimide.

11. The grinding wheel of claim 10 which wheel exhibits a wet grinding ratio of at least 90.

References Cited
UNITED STATES PATENTS

| | | | |
|---|---|---|---|
| 3,087,803 | 4/1963 | Bakian | 51—298 |
| 3,101,260 | 8/1963 | Cheney | 51—307 |
| 3,141,746 | 7/1964 | DeLai | 51—307 |
| 3,142,595 | 7/1964 | Wentorf | 51—307 |
| 3,306,720 | 2/1967 | Darrow | 51—309 |

DONALD J. ARNOLD, *Primary Examiner.*